Patented July 11, 1944

2,353,460

UNITED STATES PATENT OFFICE 2,353,460

METHOD OF OBTAINING RUBBER FROM CRYPTOSTEGIA

John W. Haefele, Ridgewood, N. J., assignor to United States Rubber Company, New York, N. Y., a corporation of New Jersey No Drawing. Application September 1, 1942, Serial No. 456,968

4 Claims. (Cl. 47—10)

This invention relates to a method of obtaining rubber from plants of the genus Cryptostegia, such as *Cryptostegia madagascariensis*, *Cryptostegia grandiflora*, and the hybrid of these two species.

At the present time rubber is commercially obtained from plants, such as guayule, by mechanically crushing and macerating the whole shrub in the presence of water, as by ball-milling the ground-up plant, whereupon the rubber becomes agglomerated and separates from the remaining portions of the plant by floating on the water. The rubber content of Cryptostegia is very seldom more than 1 to 1½% when the whole plant is considered, as against 1% to 20% rubber content in guayule. With such small rubber content of Cryptostegia, it is not commercially feasible to apply the ball-milling recovery process by which rubber is obtained from guayule. It has been previously suggested that rubber-containing plants be disintegrated by grinding or other methods, and the woody portion separated by filtering, classifying, air-blowing, or the like, so that the remainder of the plant which contains most of the rubber can be more successfully processed by a mechanical disintegration in water. By such methods, it is possible to remove at the most 40 to 50% of the woody material, and hence the concentration of rubber in the Cryptostegia so processed could be not more than 2%, which is still too low a figure to deal with commercially, in a mechanical disintegration recovery process. Furthermore, such a method is not particularly applicable to Cryptostegia as there are two rubber bearing sections of this plant, the bark section and the pith section, and it is extremely difficult to make any mechanical separation of these parts, so that all of the bark and all of the pith containing the rubber portion are removed from the woody fraction.

I have discovered a method of obtaining rubber from Cryptostegia which is quick and economical and which in effect increases the proportion of rubber sufficiently in the parts of the plant to be treated so that these plant portions may be commercially mechanically crushed and macerated in the presence of water, as by ball-milling, to recover by flotation the agglomerated rubber in a manner similar to the recovery of rubber from guayule.

In carrying out my process of obtaining rubber from Cryptostegia, sections of the stems and branches of the plant which are to be clipped and from which the rubber is to be extracted are first wounded in such a manner as to cause latex to flow to the wounds. The flow of latex to the wounds causes a concentration of rubber in such sections of the plant. In this manner when the plant parts are subsequently clipped, an increased proportion of rubber will be found in the clippings. The plant sections may be wounded by making incisions with a suitable bladed instrument, or by bruising with a scraping or beating instrument, or by crushing sufficiently to rupture the latex vessels in the bark, or in the bark and pith, or by a combination of such means. Preferably the sections are wounded sufficiently to break the bark and cause latex to exude from the abrasions and dry on the plant surfaces. In this manner, when the wounded plant sections are subsequently clipped, a still further increased proportion of rubber will be found in the clippings. If the whole plant is to be clipped for recovery of the rubber, the stems and branches may be wounded several times with rest periods from a few hours to a day or more between the various woundings to permit accumulation of latex in the previously wounded parts, or the entire stems and branches may be severely wounded as by slashing and bruising at one time and the plant then allowed to rest, preferably for at least a day, before clipping. If desired, only the end portions of the stems and branches may be wounded and then clipped after suitable resting. This may be followed by further wounding of the remaining end sections, resting, and clipping, and the operations repeated at any desired intervals, as for example, after recovery of the plant from the previous clipping operation, or after sufficient interval for appreciable growth of the plant. Repeated clipping of the end sections of the stems and branches itself increases the proportion of rubber in the clipped parts by virtue of the flow of latex to the severed or bared cross-sectional surfaces. This particular improvement is described and claimed per se in the copending application of John McGavack, Serial No. 456,967, filed September 1, 1942.

In extracting the rubber from the clipped sections, the sections may be partially dried, disintegrated with any grinding machine, and then ball-milled in water, usually from six to sixteen hours, after which the rubber agglomerates in balls or clots which float to the surface and may be skimmed off and dried. It is sometimes desirable to add a small amount of fixed alkali to the water in the ball-milling procedure. The rubber, of course, may also be extracted from the clippings by solvent processes, but such processes are not as satisfactory as simply crushing and ball-milling the water. In any case, the present invention will substantially increase the rubber content of the plant parts from which the rubber is to be extracted so that regardless of the method of finally extracting the rubber, the new method of treatment of the plants by wounding before clipping is a decided improvement over any prior suggestions of dealing with the Cryptostegia plant.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. Method of obtaining rubber from Cryptostegia which comprises wounding sections of the stems and branches of the plant in such a manner as to cause latex to flow to the wounds, thereafter clipping plant parts including the wounded sections, and extracting rubber from the clipped plant parts.

2. Method of obtaining rubber from Cryptostegia which comprises wounding sections of the stems and branches of the plant in such a manner as to cause latex to flow to the wounds, thereafter clipping plant parts including the wounded sections, and mechanically extracting the rubber from the clipped plant parts by macerating in an aqueous medium.

3. Method of obtaining rubber from Cryptostegia which comprises wounding sections of the stems and branches of the plant sufficiently to cause exudation of latex therefrom, allowing the plant to rest at least a day, thereafter clipping plant parts including the wounded sections, and extracting rubber from the clipped plant parts.

4. Method of obtaining rubber from Cryptostegia which comprises wounding sections of the stems and branches of the plant sufficiently to cause exudation of latex therefrom, allowing the plant to rest at least a day, thereafter clipping plant parts including the wounded sections, and mechanically extracting the rubber from the clipped plant parts by macerating in an aqueous meduim.

JOHN W. HAEFELE.